Aug. 18, 1959  B. B. BAUER ET AL  2,900,452
PHONOGRAPH PICKUP
Filed Oct. 18, 1955  6 Sheets-Sheet 1
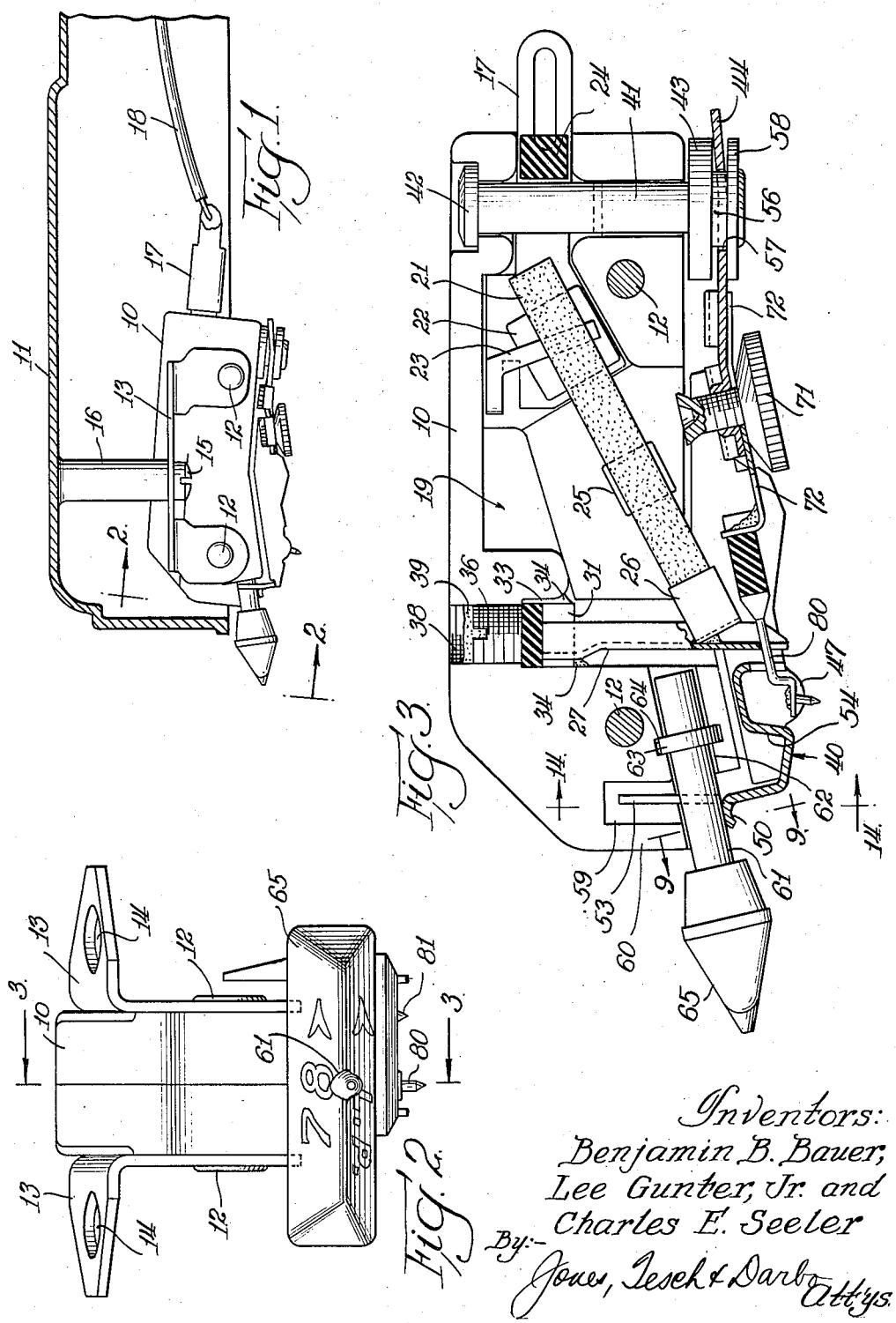
Inventors:
Benjamin B. Bauer,
Lee Gunter, Jr. and
Charles E. Seeler
By: Jones, Tesch & Darb
Attys.

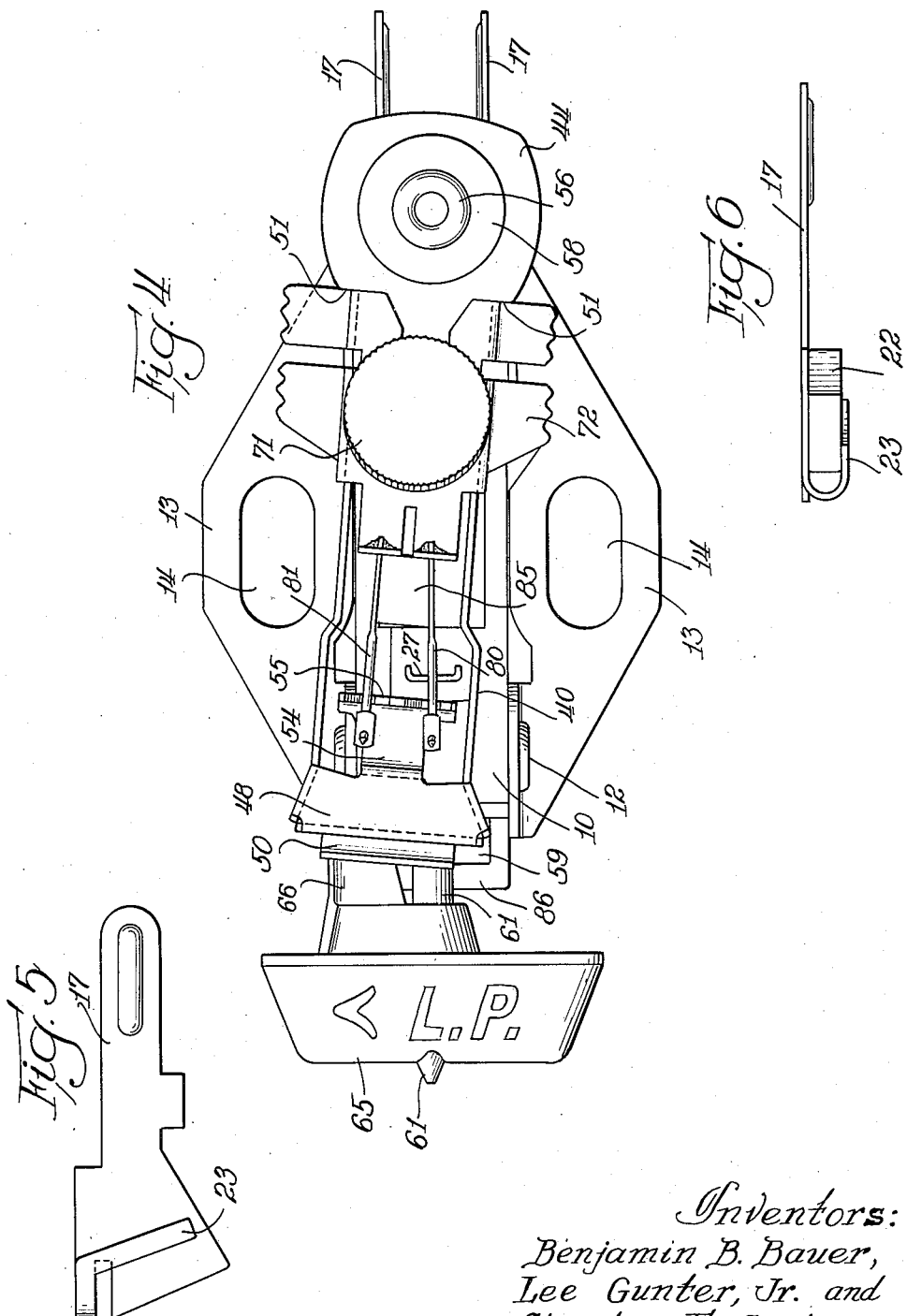

Aug. 18, 1959
B. B. BAUER ET AL
2,900,452
PHONOGRAPH PICKUP
Filed Oct. 18, 1955
6 Sheets-Sheet 3
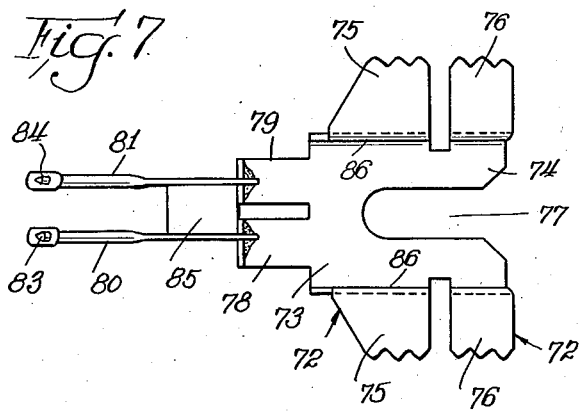
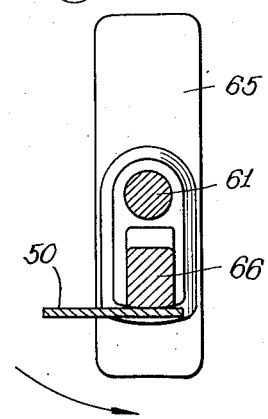
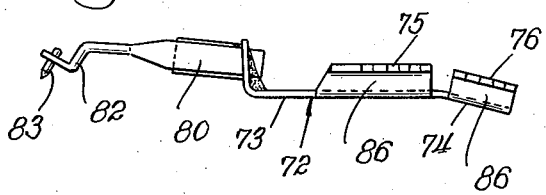
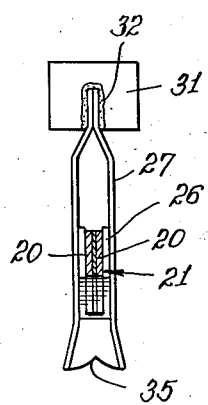
Inventors:
Benjamin B. Bauer,
Lee Gunter, Jr. and
Charles E. Seeler
By:— Jones, Tesch & Darbo
Att'ys Aug. 18, 1959

B. B. BAUER ET AL 2,900,452

PHONOGRAPH PICKUP

Filed Oct. 18, 1955

Inventors:
Benjamin B. Bauer,
Lee Gunter, Jr. and
Charles F. Seeler
By:- Jones, Tesch & Darby
Attys.

Aug. 18, 1959   B. B. BAUER ET AL   2,900,452
PHONOGRAPH PICKUP
Filed Oct. 18, 1955   6 Sheets-Sheet 5

Inventors:
Benjamin B. Bauer,
Lee Gunter, Jr. and
Charles E. Seeler
By:— Jones, Iseh & Darbo
Att'ys.

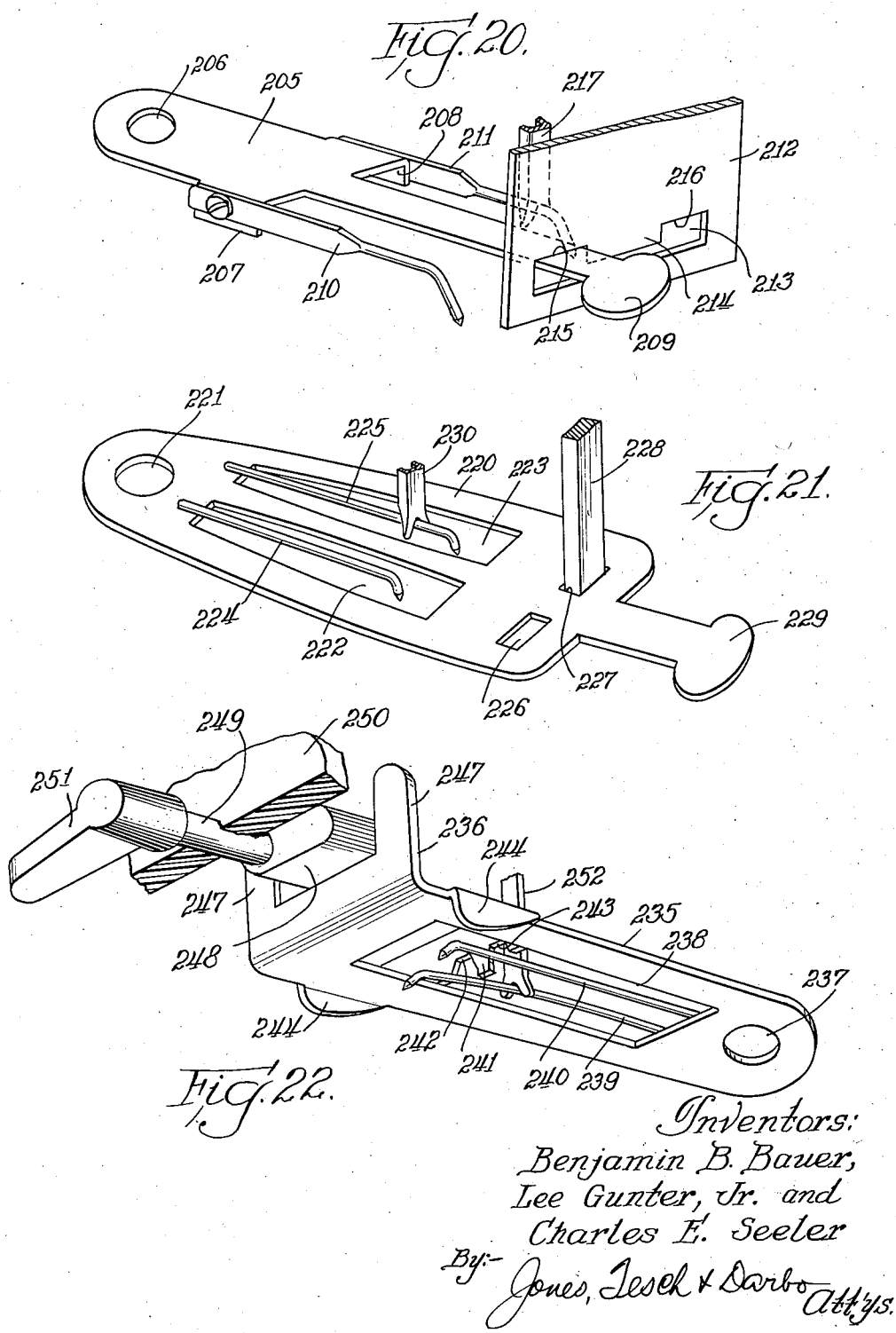

United States Patent Office 2,900,452
Patented Aug. 18, 1959

2,900,452

PHONOGRAPH PICKUP

Benjamin B. Bauer, Oak Park, Lee Gunter, Jr., Mount Prospect, and Charles E. Seeler, Chicago, Ill., assignors to Shure Brothers, Incorporated, Chicago, Ill., a corporation of Illinois Application October 18, 1955, Serial No. 541,152

10 Claims. (Cl. 179—100.41)

This invention relates to a phonograph pickup adapted to be mounted at the free end of the pivotal tone arm of a phonograph. In particular it relates to a pickup of the character described having two needles capable of being positioned interchangeably at will in the playing position.

Phonograph pickups of the two-needle type have been known heretofore and these have conventionally been so constructed that each needle projects from a different side of the pickup, and to move a needle from the inactive position to the playing position requires rotation of the pickup cartridge in the phonograph arm. Such constructions have several inherent disadvantages. The non-operating needle, as well as the operating needle, is connected to the moving system at all times, thereby creating an increase in the mass of the moving system which has no useful effect and results in a decrease in the frequency response of the pickup. This additional mass tends to increase needle-talk and reduce the ability of the operating needle to follow the record groove, particularly at high frequencies. Also the non-operating needle frequently introduces an anti-resonance into the moving system at the frequency of natural resonance of said needle, thereby creating a serious lowering of the response of the pickup at that particular frequency. Also, the mechanical means for moving one needle out of and the other needle into the playing position involves a turn-over mechanism which is complex and cumbersome and is usually unsightly and does not lend itself to a pleasing or streamline appearance.

It is the object of the present invention to provide a two-needle pickup which is free of the objections and disadvantages which have been described. It is the object of the invention to provide a pickup in which both needles are arranged on the same side of the cartridge and no turn-over operation is required to interchange the needles, but only a lateral shifting operation is required. It is another important object to provide a pickup which exhibits a high degree of fidelity and voltage sensitivity in reproducing recordings. To this end it is an object to provide a pickup in which the effective mass of the moving system is extremely low, specifically it is an object to provide a structure in which only the needle which is in the playing position is connected to the moving system and the non-operating needle is not connected to such system. With this same end of high fidelity and sensitivity in view, it is an object to provide a structure in which each needle can be designed to provide the desired response characteristics for its particular intended service and full benefit can be realized from such characteristics without interference on the part of the other needle.

Another object is to provide a pickup having an efficient mechanical transmission to connect the needle to the tranducing element which translates the mechanical vibrations into electrical vibrations.

Another object is to provide a pickup structure which utilizes to a high degree of efficiency the properties of the piezoelectric transducer for translating mechanical energy into electrical energy.

Another object is to provide a structure in which the replacement of worn needles with new needles is easy and simple for the ordinary phonograph user and in which the new needle is always positioned correctly in the pickup.

Another object is to provide a needle interchange mechanism which minimizes the likelihood of damage to the piezoelectric transducer element.

Another object is to provide a structure which is simple and economical in mechanical design and lends itself readily to rapid machine production.

Other objects and advantages will appear as the following description progresses.

In the drawings,

Fig. 1 is a side elevational view, partly in section, showing the mounting of a pickup embodiment in a phonograph tone arm, in accordance with the present invention;

Fig. 2 is a front view, on an enlarged scale, taken along broken line 2—2 of Fig. 1;

Fig. 3 is a sectional view, taken along line 3—3 of Fig. 2;

Fig. 4 is a bottom view of the same embodiment;

Figs. 5 and 6 are side and top views, respectively, of the electrical terminal member for said embodiment;

Figs. 7 and 8 are top and side views, respectively, of the replaceable needle holder member for said embodiment, with two needles mounted thereon;

Fig. 9 is a fragmental sectional view along line 9—9 of Fig. 3, showing the needle-shift mechanism in the intermediate position;

Fig. 10 is a fragmental side view, showing the piezoelectric transducer and the associated coupling member;

Fig. 11 is a view along line 11—11 of Fig. 10;

Figs. 19, 20, 21 and 22 are fragmental views, respectively, of four different embodiments of needle-shift mechanisms in accordance with the invention.

Figure 12:
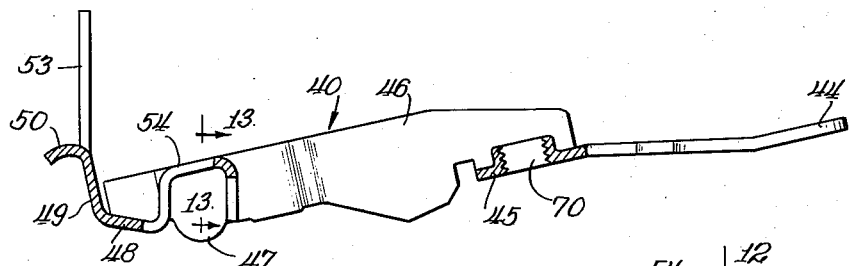
Fig. 12 is a side sectional view of the needle transport bracket, taken along line 12—12 of Fig. 13.

With respect to the pickup embodiment of Figs. 1 to 16, this comprises a casing 10 which is fixedly mounted in the free end portion of the hollow tone arm 11, which arm is pivotally attached to the phonograph (not shown) at the other end in the usual manner. The casing 10 is composed of two casing halves of suitable insulating material as synthetic resin, said halves having complementary cavities forming a suitable interior cavity 19 for the parts to be contained therein. The casing halves are fastened together by elongated rivets 12 which also fasten an angle bracket 13 to each side of the casing. Said angle brackets each has a flange extending horizontally outward from the casing, said flange having an opening 14 therein through which a threaded bolt 15 fastens the angle bracket and casing to a post 16 which extends downwardly from the top wall of tone arm 11. A pair of electrical terminals 17 extend from the rear end of the casing 10 and are connected to a pair of conductors 18 which, in turn, are connected in the usual manner to the electrical-acoustical system of the phonograph. The terminals 17 will be described more in detail hereinafter.

A piezoelectric transducer element 21, which is in the general form of an elongated bar, is mounted substantially fixedly at its rearward end portion adjacent to the rearward end of the cavity 19 in casing 10 and extends diagonally downward and forward. The element 21 is clamped between two blocks 22 of an elastomeric material such as natural or synthetic rubber, said element 21 and blocks 22 being compressed between the side walls of the cavity 19. As is shown in Fig. 11, the transducer element 21 is composed of two slabs 20 of piezoelectric substance which may be of a ceramic composition, and compressed between each slab 20 and the mounting block 22 adjacent thereto is the tab 23 of the terminal member 17. As is shown in Figs. 5 and 6, said tab extends upwardly and then curves around and extends rearwardly and joins the main portion of the terminal 17 which extends through the wall of casing 10. A single opening is provided for both terminals 17 in the rearward wall of casing 10, and a block 24 of elastomeric insulating material is compressed into said opening and between the terminals 17. The blocks 22 provide a semi-rigid mounting support for the rearward end of the transducer element 21 whereby lateral vibratory motion of the free forward end of said element under the influence of the needle, as will be described hereinafter, causes a bending action of the element with resulting generation of electrical impulses as is well understood, said impulses being transmitted to terminals 17, conductors 18 and the electrical-acoustical system of the phonograph.

At an intermediate portion of the transducer element 21, a damping block 25 is arranged on each side of the element and under compression between the element and the side wall of the cavity 19. Such damping blocks 25 are composed of a suitable damping material, such as synthetic rubber. At the forward end thereof, the element 21 has a protective covering 26 of insulating sheet material such as paper which is folded about and adhesively joined as by cement to the end portion of the element.

A coupling member 27 for transmitting mechanical vibrations from the needle to the transducer element 21 is connected in motion-transmitting relation to the free end of said element. The coupling member 27 is in the form of an elongated arm which is U-shaped in transverse section throughout the major portion of its length. At the upper end of member 27, the legs of the U are pressed together to form a flattened or blade section which is inserted in a slot in the supporting and fulcrum block 31, which is fixed in a recess 33 in the upper portion of the cavity 19. Said fulcrum block is composed of an elastomeric material, such as natural or synthetic rubber, and the coupling member 27 is fixed in the recess of said block by suitable attachment means such as rubber cement 32 (see Fig. 11). The block 31 is, likewise, fixed in position in the recess 33 by similar attaching means 34. The coupling member 27 extends downwardly from the block 31 and the free end of the transducer element 21 is received in the channel of the coupling member and is attached thereto as by cement. In the particular embodiment shown, the point of attachment of the transducer element to the coupling member is roughly two-thirds of the length of the coupling member away from the point of attachment to the block 31. The coupling member 27 extends downwardly beyond the transducer element 21 and the free end portion has a generally V-shaped notch therein, as shown at 35, for engagement with the needle 80 which is in operative position.

Means are provided for adjusting the vertical position of the coupling member 27 consisting of the screw 36 which is received in a threaded opening 38 in the top wall of the casing 10. This vertical adjustment is for the purpose of properly positioning the playing tip of needle 80. After such adjustment, cement 39 is placed in the opening 38 on top of screw 36 to fix the latter in position. In operation, the needle 80 undergoes lateral vibration in following the record groove, and coupling member 27 acts as a lever fulcrummed upon block 31 in transmitting the vibrations to the free end of transducer element 21.

The needle-shift transport bracket 40 is pivotally supported at the underside of the casing 10 on the stud 41 which passes vertically through an opening in the rearward portion of casing 10 and is held in position by flanges 42 and 43 at the opposite ends thereof. The transport bracket 40 is shown separately in Figs. 12 and 13 and consists generally of a box-like frame having a spring steel blade 44 extending rearwardly therefrom. The forward portion of the blade 44 constitutes the transverse member 45 connecting the spaced apart side members 46, the cross member 45 having its plane extending generally horizontally and the side members 46 having their planes extending generally vertically. At the forward portions thereof, one of the side walls 46 has a downward protuberance 47 as shown, which protuberance occurs at approximately the same location (from front to back) as do the needle points, said protuberance 47 serving as a bumper to absorb shock and prevent injury to the needles and the transducer element in case the pickup or tone arm is accidentally dropped. At the forward end of the bracket the side members 46 are connected by the integral cross member 48. Cross member 48 has a forward and upward extension 49 which terminates in a horizontally disposed lip 50 which is curved so as to present a convex upper surface. Lip 50 serves as a cam surface for the shifting operation as will be described hereinafter. At the forward end of bracket 40 are the two transversely spaced apart upwardly projecting arms 53 which also serve as cam surfaces for shifting the transport bracket and holding it rigidly in each of the two playing positions thereof.

Figure 13:
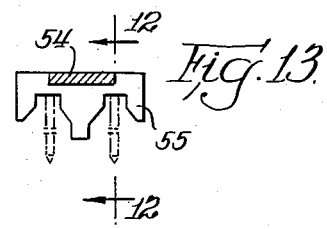
Fig. 13 is a view of the same bracket, along line 13—13 of Fig. 12, and indicating the positions of the two needles.

Extending rearwardly from the cross member 48 and located substantially midway between the side members 46 is the arm 54 which terminates in a needle-carrier element 55 having two downwardly opening notches which serve to carry the needles and maintain them in proper position during the shifting operation. The arm 54 extends upwardly immediately adjacent to cross member 48 and then at a level substantially equal to that of the top edge of cross members 46 it extends horizontally rearwardly until it is joined integrally to the needle-carrier 55 which extends downwardly. Needle-carrier 55 is wider then arm 54 as is shown in Fig. 13.

Blade 44 of transport bracket 40 is pivotally mounted on the end portion 56 of stud 41 which extends below flange 43, blade 44 having an opening 57 in its rearward end portion for this purpose. Said end portion is widened and has edges 51 projecting laterally from both sides, which edges serve as stops when inserting the needle holder as will be described hereinafter. The blade 44 is held in position by washer 58 upon the end of projecting portion 56 of stud 41, the end of the stud being peened outwardly to hold the washer 58 in place. The rearward end portion of blade 44 has an upward bend therein, as shown in Figs. 3 and 12 and the forward lip 50 of bracket 40 rests against a cooperating cam surface which will be described hereinafter, the arrangement being such that blade 44 is held under spring pressure between flange 43 and washer 58 whereby the bracket 40 is constantly urged against the said cooperating cam surface, whereby, in all of its positions, the bracket is held firmly under resilient pressure. As is shown in Fig. 3, a recess 59 is provided in the forward portion of casing 10 to accommodate the cam-arms 53 of bracket 40, and the casing has a downward projection 60 forward of recess 59 and bearing against shaft 61.

Cooperating with the front portion of the transport bracket 40, and specifically with lip 50 and arms 53 thereof, is the manually operated cam-shift mechanism comprising a shaft 61 extending rearwardly and at a slight upward incline into a cooperating cylindrical recess 62 in the casing 10, said shaft being freely rotatable in said recess. A circumferential bead or flange 63 is provided on shaft 61 and a cooperating circumferential recess 64 is provided in casing 10 to restrain the shaft against longitudinal movement.

Fixedly mounted upon the forward end of shaft 61 is the handle or knob 65 which is manually operable for the shifting operation. The knob 65 has greater length than width and extends generally transversely with respect to shaft 61. Integral with knob 65 and extending rearwardly therefrom eccentrically with respect to shaft 61 is the cam member 66 which cooperates with lip 50 and arms 53 of transport bracket 40 for the needle-shift operation. As shown in Fig. 9, the cam surface of cam 66, i.e., the surface remote from shaft 61, is curved for the camming function.

Two needles are fixedly and replaceably fastened to transport bracket 40. For this purpose, a threaded opening 70 is provided in cross member 45 of said bracket. Into opening 70 is threaded the thumb screw 71, the end portion of the shaft of said screw being peened outwardly to prevent complete removal from cross member 45. Screw 71 holds in clamping engagement with cross member 45 the needle holder 72 which is in the form of a sheet-form yoke (see Figs. 7 and 8) having a flat main section 73 and a downwardly bent rearward section 74. Extending laterally outward from sections 73 and 74, respectively, are the wing sections 75 and 76 which have serrated edges for easy gripping with the fingers, said wing sections being offset upwardly to provide flanges 86 which assist in guiding the yoke to and positioning it in the clamped condition. Extending longitudinally inward from the rear end of section 74 and into main section 73 is the slot 77 by means of which the yoke can be engaged by screw 71 as will be described hereinafter. The forward end portion of main section 73 is bifurcated to form two fingers 78 and 79, the end portions of said fingers being turned upwardly substantially at right angles to the main portions of said fingers. Said end portions of fingers 78 and 79 are vertically slotted and into the slot of finger 78 is fitted the shank of needle 80, and, likewise, into the slot of finger 79 is fitted the shank of needle 81, said needles extending generally horizontally forward from the fingers 78 and 79. The shanks of the needles are composed of resilient metal such as spring steel and the rearward portions thereof are flattened so that they are wide vertically and narrow horizontally and exhibit considerable resilience in the horizontal direction and substantial rigidity in the vertical direction. The forward portions of said needle shanks are substantially cylindrical. Such forward portions need not be of any particular shape in cross section, and they may be angular instead of cylindrical. The forward end portions of the needle shanks are offset downwardly as indicated at 82. In the embodiment illustrated, a precious metal point 83 is received in an opening in the free end portion of the needle shank and is suitably fixed thereto as by cement, solder, etc. A needle point 84 is similarly fixed to the shank of needle 81, the needle 80, for example, being adapted for use with records operating at 78 r.p.m. and needle 81 with records operating at 33 and 45 r.p.m. A block of suitable damping material 85, such as synthetic rubber, is arranged between needles 80 and 81 adjacent to fingers 78 and 79 and is cemented to said needles.

The insertion of the needle holder 72 into the pickup is accomplished by loosening screw 71 and pushing said holder rearwardly into position with slot 77 receiving screw 71, the operation being continued until the ends of the flanges 86 encounter edges 51 of blade 44. The flanges 86 engage the side members 46 of bracket 40 and assist in positioning the holder 72 during this inserting operation. The screw is then tightened whereby the holder 72 is clamped in position and the pickup is ready for operation. The flanges 86 also serve to position holder 72 properly in the clamped condition.

Figure 14:
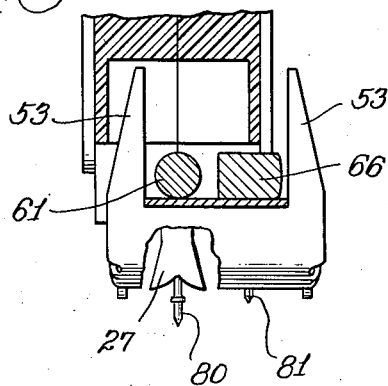
Figs. 14, 15 and 16 are fragmental views along line 14—14 of Fig. 3, showing the shifting mechanism in the three positions thereof, (a) in which one needle is in playing position, (b) the intermediate position, and (c) in which the other needle is in playing position.
Figure 15:
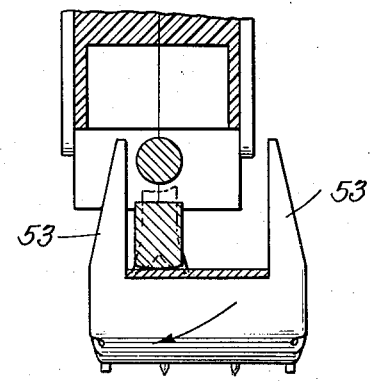

Assuming that needle 80 is in the playing position, which position is illustrated in Figs. 2, 3, 4 and 14, the control 65 is in position with the cam 66 to the right of the shaft 61, as viewed in Figs. 2 and 14, and to the left of said shaft as viewed in Fig. 4. As stated heretofore, needle 80 is adapted for use with a record operating at 78 r.p.m., and in the position described the indicia "78" is visible to the operator upon knob 65 as shown in Fig. 2. Needle 80 is in operative pressure engagement with coupling member 27. In this position, cam 66 permits transport bracket 40 to be in the upper position thereof indicated in Fig. 3 in which needle 80 is urged with spring pressure against coupling member 27 because in this position of the transport bracket the notched end of coupling member 27 is at a lower position than the needle-engaging surface of the carrier 55 (see Fig. 3). In this position, finger 78 flexes downwardly to accommodate part of the downward movement of needle 80 (relative to needle 81) induced by coupling member 27. With the pickup in the position shown, the tone arm 11 is manually adjusted so that the needle 80 is in engagement with the record groove and operation of the phonograph takes place. The needle 80 undergoes lateral vibration in following the lateral undulations of the record groove. Such vibrations are transmitted by coupling member 27 to the free end of transducer element 21, the coupler 27 acting as a lever in this operation, the fulcrum being the supporting block 31. The element 21 undergoes bending and thereby generates electrical vibrations corresponding to the mechanical vibrations of the needle, the electrical vibrations being transmitted by terminals 17 and conductors 18 to the electro-acoustical system of the phonograph.

From Figs. 4 and 14 it is seen that only the mass of needle 80 contributes to the mass of the moving system which is in motion-transmitting relation with the coupling member 27. The guide arms 53 of the shift-transport bracket 40 engage the surfaces of shaft 61 and cam 66 whereby the lateral position of the bracket is fixed and it is stationary relative to casing 10 and is incapable of undergoing vibration which might be induced by the needle 80. The twin-needle holder 72 is rigidly fixed to transport bracket 40 by the clamping action of screw 71 whereby said holder is held in fixed stationary position by the transport bracket 40. The fingers 78 and 79 of the holder 72 are rigid in the horizontal direction, and all lateral vibration of the needle 80 is accommodated by flexure of the shank of said needle, principally the vertically flattened portion of said shank. The needle shank exhibits a high degree of horizontal compliance and operation takes place with cantilever action. As a result of the horizontal rigidity of fingers 78 and 79, none of the vibratory energy of needle 80 is transmitted to needle 81 and the response characteristics of needle 81 do not have any effect upon the reproduction performance. As a result, the mass of the moving system in motion-transmitting relation with coupler 27 is at a minimum and only the frequency response characteristics of needle 80 are effective in the reproducing operation. The needle 80 can therefore be designed so as to have the best possible response characteristics for its intended operation, i.e., to reproduce recordings operated at 78 r.p.m.

Figure 16:
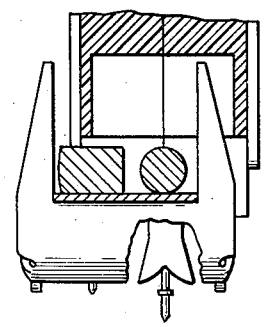

Assuming now that it is desired to reproduce from a recording operating at 33 r.p.m., the knob-control 65 is manually moved from the position shown in Figs. 2, 4 and 14 to the position shown in Fig. 16. In the course of this operation, said control is moved through the intermediate position shown in Fig. 15. The control is rotated in a clockwise direction, as viewed in Figs. 14, 15 and 16. When moving to the intermediate position, the cam 66, in engagement with lip 50 first moves the forward end of bracket 40 downwardly, in the course of which movement, needle carrier 55 engages needle 80 and moves it downwardly out of engagement with coupling member 27. Needle 81 has all the time, including the time when needle 80 is in the operative or playing position, been in engagement with needle carrier 55 and it, also, is moved downwardly when the bracket 40 is moved to the intermediate position. In this position, the cam 66 is vertically beneath shaft 61, and with continued movement, the surface of cam 66 engages arm 53 on the opposite side of bracket 40 (on the left side as viewed in Figs. 14, 15 and 16) and moves the bracket to the left as indicated in Fig. 16. As this movement is completed, cam 66 moves to the more elevated position shown in Fig. 16 and bracket 40 is permitted to rise under the influence of spring blade 44 and return to substantially the same vertical position as originally occupied, such position being shown in Figs. 3 and 16. At the same time, the needles 80 and 81 are moved to the left by needle carrier 55, which carrier rises with bracket 40 and permits needle 81 to ascend into engagement with coupling member 27. At this time, the assembly of the transport bracket 40, needle holder 72 and needles 80 and 81 is in the position shown in Fig. 16, and needle 81 is in the operative or playing position. Said needle is held down by coupling member 27 out of contact with needle carrier 55 so that it is free to vibrate in response to the lateral undulations of the record groove. The operational capabilities are probably best visualized by observance of Fig. 4, with the understanding that needle 81, instead of needle 80, is in operative engagement with coupling member 27. It is seen that, here again, the total mass of the moving system in motion-transmissive relation with coupling member 27 is in the mass of needle 81. For reasons which have been pointed out heretofore, the entire vibratory motion undergone by needle 81 in response to undulations of the record groove is accommodated by the horizontal compliance of the shank of needle 81. The needle holder 72 and the fingers 78 and 79 are held rigidly stationary relative to casing 10, as is also the inactive needle 80, whereby the only characteristics which come into play during performance are the characteristics of needle 81 and it can be designed to have the best possible characteristics for its purpose, i.e., to reproduce records operating at 33 r.p.m.

When it is again desired to interchange needles 80 and 81 and reproduce a 78 r.p.m. record with needle 80, the cam-control knob 65 is moved in the direction opposite to that previously described, i.e. in the counterclockwise direction, to the position first described and illustrated in Figs. 2, 3, 4 and 14. The interchange of needles is extremely easy and simple for the ordinary phonograph user.

Other advantages are evident from the foregoing description. For example, there is no turn-over mechanism with the attendant objections which have been mentioned in the foregoing, but rather a relatively simple lateral shift mechanism. Also, the replacement of worn needles is easy and simple. All that needs to be done is to loosen screw 71, grasp holder 72 between the fingers, applying the finger pressure to the serrated edges of the extensions 75 and 76. New needles are then inserted by reversing the procedure, namely, inserting the new holder 72 underneath the spring 71, pushing the holder rearwardly until the screw contacts the end of slot 77, and then tightening screw 71. It is seen from Figs. 3 and 8 that coinciding bends are provided in holder 72 and the blade 44 of bracket 40.

The pickup structure of the invention exhibits a high degree of efficiency in the mechanical transmission of vibratory motion from the needle to the transducing element 21. The transmission is by a lever system in which the coupling member 27 is the lever. It is fulcrumed at its upper end in elastic-compliant block 31. It receives the force or motion at its lower end and it transmits said force or motion to the transducing element at its intermediate portion, which in the specific embodiment described is located approximately two-thirds of the length of the lever from the fulcrum. This provides an efficient mechanical transmission system which functions with a high degree of fidelity in converting undulations of the record groove to vibrations of the free end of the transducer element, and hence in converting the mechanical vibratory energy into electrical energy. Additionally, since the coupling member is pivotally mounted at one end, it allows substantially no vertical vibration to be transmitted to the transducer, and as a result eliminates distortion and surface noise caused by vertical vibration due to imperfections in the record. Furthermore, any sudden vertical jar, for example as may be caused by dropping the pickup, will not be transmitted to the transducer element, thus avoiding the danger of its accidental fracture.

The pickup of the invention has the additional advantage that protection is provided in case the tone arm is dropped. The protuberance 47 protects against damage to the transducer element 21. The construction is such that while the needle may strike the surface first, the needle shank and the finger 78 (or 79) undergo vertical flexure and the protuberance 47 then makes contact and absorbs the major portion of the shock, and it is not transmitted from the needle to the transducer element where it would cause damage or impairment.

The pickup which has been described is simple and economical with respect to both structure and fabrication procedure and lends itself to rapid machine production.

Figure 17:
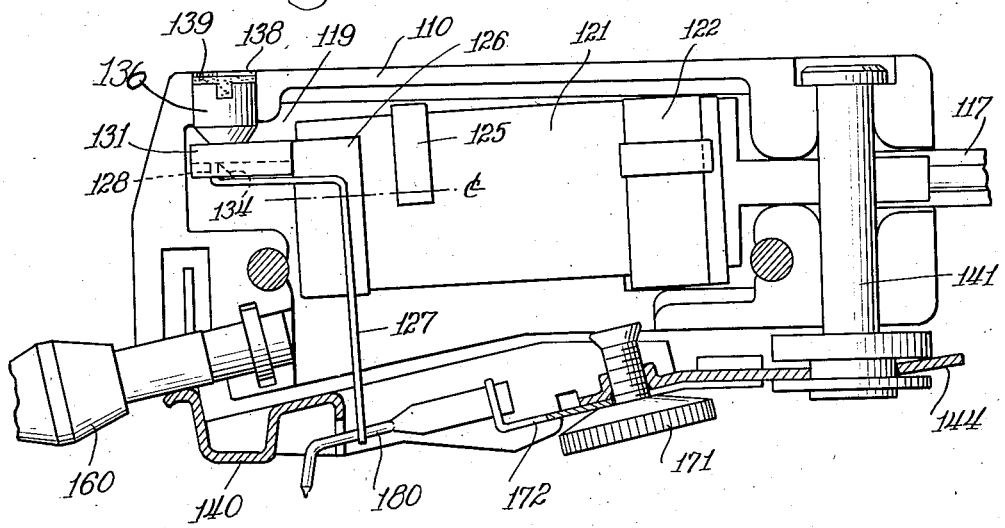
Fig. 17 is a view, similar to Fig. 3, of a different embodiment of the pickup of the invention.
Figure 18:
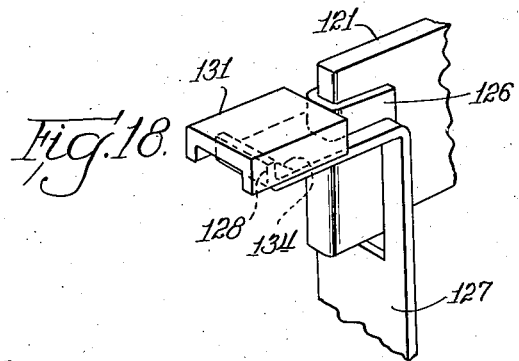
Fig. 18 is a fragmental perspective view of the embodiment of Fig. 17.
Figure 19:
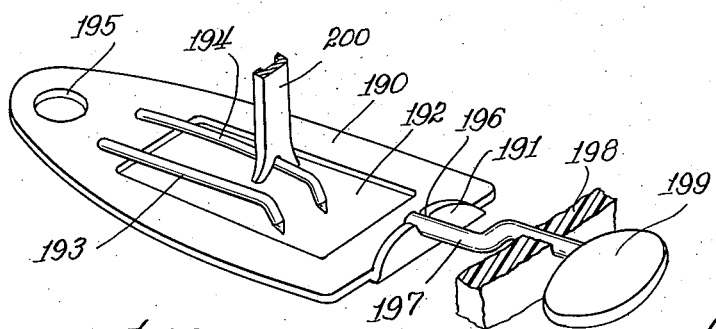

A different embodiment of the pickup of the invention is shown in Figs. 17 and 18. This is generally similar to the embodiment of Figs. 1 to 16, with the difference that it has a twister-type Rochelle salt piezoelectric transducer element instead of a bender type of ceramic transducer element. The transducer element 121 is contained in the cavity 119 of the casing 110, and is in the general shape of a plate which is wider for its length than is the transducer element 21 of the embodiment of Figs. 1 to 16. The longitudinal axis of element 121 is inclined downwardly only slightly with respect to the longitudinal axis of casing 110, in comparison with the arrangement of element 21 of the embodiment of Figs. 1 to 16. At its rearward end portion, element 121 is held in position within cavity 119 by a pair of blocks 122 of elastomeric material. Element 121 is composed of two thin slabs of Rochelle salt and each thin slab is connected to a terminal 117 in a manner similar to that described hereinbefore in connection with the embodiment of Figs. 1 to 16. At the upper part of its intermediate portion, a damping block 125 is arranged on each side of the element and under compression between the element and the wall of cavity 119. At the forward end thereof, element 121 is connected to coupling member 127, said member being in the form of an elongated L-shaped arm which has an elongated slot in its midportion including the junction of the legs of the L, for reception of the free forward end portion of the transduced element 121. A protective insulating sheet covering 126 is provided for the end portion of element 121 and is arranged between said element and coupler 127, the covering being joined to the element 121 and the coupler being joined to the covering as by cement. The lower leg of the L-shaped coupler extends downwardly and has a notched end portion making motion-transmissive engagement with the needle 180. The upper leg of said coupler extends forwardly from transducer element 121 and the end portion thereof is turned upwardly to form a flange 128 which is received in the interior of a channel-shaped supporting and fulcrum block 131. Block 131 is mounted in cavity 119 with the legs of the channel projecting downwardly and with the longitudinal axis of the channel generally parallel to the longitudinal axis of casing 110. It is held under compression between, and is adhesively joined, as by cement, to the side walls of cavity 119. The flange 128 is of a width so as to fit between the legs of channel 131, and the end of said flange rests against the base of the channel. The end portion of coupler 127 is joined to the block 131 by suitable means as cement 134, said cement being preferably located interiorly with respect to the angle formed between flange 128 and the leg of coupler 127.

The adjusting screw 136 is threadedly received in an opening 138 in the upper wall of casing 110, and is threaded downwardly, and carries with it block 131 and coupler 127, until said coupler has reached the proper operating position, in the same manner as described in connection with the adjustment of coupler 27 of the device of Figs. 1 to 16. The arrangement is such that in its final position, the top of screw 136 is beneath the top surface of casing 110 whereby the upper portion of the opening 138 is a recess. Cement 139 is placed in said recess, said cement thereafter setting and fixing screw 136 with respect to its position in casing 110. At the same time, the cement joining supporting block 131 to casing 110 sets and fixes said supporting block in position.

The remainder of the parts of the embodiment of Figs. 17 and 18, and their cooperative relationship one with another, are similar to those of the device of Figs. 1 to 16 and will not be described herein. The parts are designated in Figs. 17 and 18 by numerals 100 greater than the designating numerals for the corresponding parts of the device of Figs. 1 to 16.

In the embodiment of Figs. 17 and 18, the coupler 127 traverses transversely the major portion of the width of transducer element 121 and is connected to said element in positive motion-transmissive relation throughout said traverse. In operation, lateral vibrations are transmitted by needle 180 to the end of coupler 127 and said coupler acts as a lever, fulcrumed in block 131, in transmitting the vibrations to the transducer element 121. In the embodiment specifically described and illustrated, the axis of motion is slightly above the true longitudinal axis of the element, as indicated in Fig. 17. Also, in this embodiment there are two needles which are interchangeable by means similar to that described in connection with the embodiment of Figs. 1 to 16. The needle 180 which is specifically illustrated does not have a jewel point such as sapphire or diamond, but has a metal point, such as osmium suitably fixed in place as by welding or soldering.

Several modifications of the mechanism for interchanging needles are shown fragmentally in Figs. 19, 20, 21 and 22. In the embodiment shown in Fig. 19, the needle transport bracket 190 is in the general form of a flat plate having an upturned flange 191 at the forward end thereof. The main portion of the bracket 190 has a large opening 192 therein and the two needles 193 and 194 are fixedly mounted at the rearward end thereof upon the portion of the bracket rearwardly of opening 192 as by soldering, welding, etc. The rearward end of bracket 190 has a smaller opening 195 therein whereby the bracket is adapted to be pivotally mounted upon the pickup housing in the same manner as is the tongue 44 of bracket 40 is pivotally mounted on stud 41 of the device of Figs. 1 to 17.

The flange 191 has a notch or recess 196 in substantially the mid-portion thereof, and a crank 197 is pivotally mounted upon a portion 198 of the casing similar to the to the portion 60 of casing 10 located forwardly of recess 59 in the device of Figs. 1 to 16. The crank 197 has a handle portion 199 located forwardly of the casing member 198 and the crank is adapted to be pivoted from the operative position shown in which the handle extends generally horizontally in one direction to the other operative position in which the handle extends horizontally in the opposite direction. The arrangement is such that in the position shown, needle 194 is in upward spring pressure engagement with the coupling member 200 which is similar to the coupling member 27 of the device of Figs. 1 to 16, and needle 194 is, therefore, in the playing position. When the handle 199 is moved to the other position as previously described, crank 197 first moves the transport bracket 190 downwardly whereby needle 194 is moved downwardly out of engagement with coupling member 200, the bracket is then shifted to the right, as viewed in Fig. 19, and then is allowed to rise to the position in which needle 193 is in pressure operative engagement with coupling member 200. In this embodiment, as in those of Figs. 1 to 18, the needle-transport bracket is held rigidly in position (by the crank 197), and the only mass of the moving system in motion-transmissive relation with the coupling member 200 is that of the needle which is in operative or playing position.

In Fig. 20 there is shown a shift-transport bracket 205 which is adapted to be pivotally mounted upon a casing similar to casing 10 of the device of Figs. 1 to 16, said bracket being in the general form of a flat plate and having an opening 206 at the rearward end thereof for engagement with a pivotal support such as the stud 41 shown in Fig. 3, and has two downwardly extending flanges 207 and 208 joined to the side edges thereof, and a tongue 209 projecting forwardly therefrom. The needles 210 and 211 are replaceably mounted as shown upon flanges 207 and 208, respectively. The tongue 209 cooperates with a retaining member 212 which may be a part of the pickup casing generally similar in arrangement to portion 60 of casing 10, or it may be a separate part supported by such a casing. Retaining member 212 is in the general form of a flat plate and has a horizontally elongated opening 213 in the lower portion thereof with an angular projection 214 extending downwardly from the mid-portion of the upper edge of opening 213 forming recesses 215 and 216 on each side, respectively, of the projection 214.

In the position shown in Fig. 20, tongue-control member 209 is in recess 215, and the arrangement is such that said tongue bears with resilient pressure against the upper edge of said recess. Needle 211, in this position, is in operative engagement with coupling member 217 similar to coupler 27 of the device of Figs. 1 to 17, and, since tongue 209 is held substantially rigidly in recess 215 and said tongue and transport-bracket are substantially rigid in the horizontal direction, the only mass of the moving system connected in motion-transmissive relation to coupler 217 is the mass of needle 211. To interchange the needles, tongue 209 is pushed downward, which depresses the forward end of bracket 205 and both needles 210 and 211 and moves needles 211 out of engagement with coupler 217. Tongue 209 is then moved toward the right, as viewed in Fig. 20, and into recess 216, during which operation needle 211 is moved out of the operative position and needle 210 is moved to a position just below coupler 217. Tongue 209 is then allowed to rise into recess 216 and needle 210 rises into resilient pressure contact with coupler 217, in which position needle 210 is in playing position and needle 211 is inactive.

In Fig. 21 is shown a different embodiment of shift-transport bracket 220 which is in the general form of a flat plate with an opening 221 at the rearward end portion thereof for mounting pivotally on a support similar to stud 41 shown in Fig. 3. Forwardly of opening 221 there are two longitudinally elongated openings 222 and 223, and needles 224 and 225 are fixed to the rearward portion of the bracket and extend forwardly in openings 222 and 223. Forwardly of openings 222 and 223 are smaller openings 226 and 227 which are adapted to cooperate with a retaining element 228 which may be a part of the forward portion of the casing, generally similar to part 60 shown in Fig. 3. Projecting forwardly from the bracket is the operating tongue or handle 229.

In the position shown in Fig. 21, needle 225 is in playing position and is in motion-transmissive engagement with coupling member 230, which is similar to coupling member 27 of the device shown in Fig. 3. To interchange needles, the operating handle 229 is pushed downwardly, thereby freeing bracket 220 from engagement with retaining bar 228 and also freeing needle 225 of engagement with coupling member 230. The handle 229 is then shifted to the right, as viewed in Fig. 21, to the position in which retaining bar 228 is in alignment with opening 226, whereupon handle 229 and bracket 220 are allowed to rise, whereby the bracket is engaged and held in fixed position by bar 228 and needle 224 comes into operative engagement with coupling member 230. In this embodiment, also, the only mass which is effective or active in the moving system is that of the needle in engagement with coupling member 230. The bracket is held substantially rigidly by bar 228 and is substantially rigid in the horizontal direction whereby the vibrations induced by the record groove are confined to the needle which is in the playing position and are not transmitted to bracket 220 and the needle which is in the inactive position.

In Fig. 22 is shown a modification in which the shift-transport bracket 235 is in the general shape of a flat plate with an upturned flange 236 at the forward end thereof. An opening 237 is provided in the rearward portion of the bracket, which opening is adapted to cooperate with a pivotal support similar to stud 41 shown in Fig. 3. In the mid-portion of bracket 235 is an elongated opening 238, and needles 239 and 240 are fixedly mounted rearwardly of opening 238 and extend forwardly. At a forward portion of opening 238, a needle carrier member 241 is mounted on the bracket 235 and extends across opening 238, said carrier member having two notches 242 and 243 adapted, respectively, to engage needles 239 and 240. Adjacent to the forward end portion of opening 238 is a pair of downwardly extending bumpers 244, which are turned-down extensions from the edges of bracket member 235.

Projecting upwardly from flange 236 is a pair of spaced apart arms 247 and cooperating with said arms is a cam 248 which is fixedly mounted upon the rearward end of shaft 249 which is rotatably mounted in the forward portion of a housing similar to portion 60 of housing 20 of the device of Figs. 1 to 16. At the forward end of shaft 249 is fixedly mounted the operating knob or handle 251.

A coupling member 252, similar to coupling member 27 of the device of Figs. 1 to 16, extends downwardly from the casing (not shown) and, in the position shown in Fig. 22 is in operative engagement with needle 239. For interchange of needles, handle 251 is rotated clockwise (as viewed in Fig. 22) through an angle of approximately 180 degrees, thereby moving needle 239 out of engagement with coupling member 252, then shifting both needles to the left (as viewed in Fig. 22) then allowing the needles to rise whereby needle 240 ascends into operative engagement with coupling member 252, this operation being similar to the corresponding operation which has been described heretofore in connection with the apparatus of Figs. 1 to 16. In the embodiment of Fig. 22, the mass of the moving system in motion-transmissive relation with coupling member 252 is only the mass of the needle which is in the playing position. The cam 248 holds the bracket 235 substantially rigidly against horizontal vibration, and the bracket 235 being substantially rigid in the horizontal direction, vibratory motion is not transmitted to the bracket but is confined to the needle which is in the playing position.

Invention is claimed as follows:

1. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, said transport member being pivotally mounted on said casing for lateral shift movement from a position in which one of said needles is in operative position to a position in which the other needle is in operative position, and vice versa, a coupling member substantially rigid for transmitting motion from a needle in operative position to said transducer element, one end of said coupling member being pivotally mounted, shift means for imparting selectively at will said lateral shift movement to said needle-transport member.

2. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, said transport member being pivotally mounted on said casing for lateral shift movement from a position in which one of said needles is in operative position to a position in which the other needle is in operative position, and vice versa, a substantially rigid coupling member for transmitting motion from a needle in operative position to said transducer element, one end of said coupling member being pivotally mounted, shift means for imparting selectively at will said lateral shift movement to said needle-transport member, and resilient means for urging said transport member toward said coupling member whereby the needle in operative position engages said coupling member with resilient pressure.

3. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, said transport member being pivotally mounted on said casing for lateral shift movement from a position in which one of said needles is in operative position to a position in which the other needle is in operative position, and vice versa, a substantially rigid coupling member for transmitting motion from a needle in operative position to said transducer element, one end of said coupling member being pivotally mounted, shift means for imparting selectively at will said lateral shift movement to said needle-transport member, and means for holding said transport member and the inactive needle supported thereby substantially stationary relative to said casing in the direction of vibration of the needle in playing position.

4. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, said transport member being pivotally mounted on said casing for lateral shift movement from a position in which one of said needles is in operative position to a position in which the other needle is in operative position, and vice versa, a substantially rigid coupling member for transmitting motion from a needle in operative position to said transducer element, one end of said coupling member being pivotally mounted, shift means for imparting selectively at will said lateral shift movement to said needle-transport member, said transport member and said shift means having cooperating cam surfaces which in both of said operative positions fix said transport member against lateral motion which might be induced by the needle in operative position.

5. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, a substantially rigid coupling member for transmitting motion from a needle in operative position to said transducer element, one end of said coupling member being pivotally mounted, said transport member being mounted on said casing for motion in directions respectively toward and away from said coupling member and laterally with respect to said coupling member, and shift means supported by said casing for moving said transport member away from said coupling member, then laterally with respect to said coupling member, then toward said coupling member.

6. In a phonograph pickup, a casing, a transducer element mounted in said casing with a portion thereof adapted to undergo motion relative to another portion and thereby generate electrical energy, a needle-transport member, a pair of needles mounted on said transport member with their playing points projecting generally in the same direction, a substantially rigid coupling member for transmitting motion from a needle in operative position to said transducer element, one end of said coupling member being pivotally mounted, said transport member being mounted on said casing for motion in directions respectively toward and away from said coupling member and laterally with respect to said coupling member, and shift means supported by said casing for moving said transport member away from said coupling member to disengage the first of said needles from said coupling member, then laterally to move said first needle out of alignment with said operating member and the second of said needles into alignment with said coupling member, and then toward said coupling member to move said second needle into engagement with said operating member.

7. Phonograph pickup as claimed in claim 6 in which said transport member is pivotally mounted on said casing by a resilient member so arranged that said lateral motion is a pivotal motion and said toward and away motion is accomplished by a flexing of said resilient member.

8. In a phonograph pickup, a casing, a transducer element mounted in said casing with a portion thereof adapted to undergo motion relative to another portion and thereby generate electrical energy, a needle-transport member, a needle holder replaceably mounted on said transport member, a pair of needles mounted on said holder with the playing points thereof directed generally in the same direction, said transport member being pivotally mounted on said casing for lateral shift movement from a position in which one of said needles is in operative position to a position in which the other needle is in operative position, and vice versa, a substantially rigid coupling member for transmitting motion from a needle in operative position to said transducer element, one end of said coupling member being pivotally mounted, shift means for imparting selectively at will said lateral shift movement to said needle-transport member.

9. In a phonograph pickup, a casing, a transducer element mounted in said casing with a portion thereof adapted to undergo motion relative to another portion and thereby generate electrical energy, a needle transport-member, a needle holder mounted on said transport member, means releasable at will for clamping said holder to said transport member, cooperative means on said holder and said transport member for establishing a predetermined positional relationship between the two in the clamped condition thereof, a pair of needles mounted on said holder with the playing points thereof directed generally in the same direction, said transport member being pivotally mounted on said casing for lateral shift movement from a position in which one of said needles is in operative position to a position in which the other needle is in operative position, and vice versa, a substantially rigid coupling member for transmitting motion from a needle in operative position to said transducer element, one end of said coupling member being pivotally mounted, shift means for imparting selectively at will said lateral shift movement to said needle-transport member.

10. Phonograph pickup as claimed in claim 9 in which the needle holder is a generally sheet-form member having a slot extending inwardly from an edge thereof to permit manipulation thereof to a position beneath the clamping means and having sections angularly disposed relative to other sections thereof, said sections cooperating with surfaces of the transport member to establish said predetermined positional relationship between said holder and said member in the clamped condition of said holder.

References Cited in the file of this patent

UNITED STATES PATENTS

| | | |
|---|---|---|
| 2,554,209 | Miner et al. | May 22, 1951 |
| 2,563,196 | Spry | Aug. 7, 1951 |
| 2,634,336 | Dreisbach | Apr. 7, 1953 |
| 2,711,322 | Dally | June 21, 1955 |
| 2,816,056 | Harris | Dec. 10, 1957 |